United States Patent
Schott

(10) Patent No.: US 7,431,510 B2
(45) Date of Patent: Oct. 7, 2008

(54) PIVOT BEARING WITH LUBRICANT TRANSMISSION

(75) Inventor: Andre Schott, Niederwerrn (DE)

(73) Assignee: Rexroth Star GmbH, Schweinfurt (DE)

( * ) Notice: Subject to any disclaimer, the term of this patent is extended or adjusted under 35 U.S.C. 154(b) by 264 days.

(21) Appl. No.: 11/220,102

(22) Filed: Sep. 6, 2005

(65) Prior Publication Data

US 2006/0051005 A1    Mar. 9, 2006

(30) Foreign Application Priority Data

Sep. 10, 2004   (DE) ................ 10 2004 043 749

(51) Int. Cl.
*F16C 19/08* (2006.01)
*F16H 25/02* (2006.01)

(52) U.S. Cl. ................ 384/462; 384/466; 74/89.44

(58) Field of Classification Search ......... 384/474–477, 384/466–470, 569–571, 462; 74/89.43, 89.44
See application file for complete search history.

(56) References Cited

U.S. PATENT DOCUMENTS

| | | | |
|---|---|---|---|
| 1,909,525 A * | 5/1933 | Curtis .................... 384/474 |
| 1,913,769 A * | 6/1933 | Moreland ................ 384/477 |
| 3,400,696 A * | 9/1968 | Thompson .............. 123/90.27 |
| 3,885,842 A * | 5/1975 | Furutsu ................... 384/468 |
| 4,076,336 A * | 2/1978 | Howell ...................... 384/12 |
| 5,362,159 A * | 11/1994 | Kufner et al. ............. 384/484 |
| 6,227,713 B1 * | 5/2001 | Neder et al. .............. 384/484 |
| 6,357,922 B1 * | 3/2002 | Harbottle et al. ......... 384/466 |
| 6,428,212 B1 * | 8/2002 | Tanaka ..................... 384/475 |
| 6,457,870 B2 * | 10/2002 | Aizawa et al. ............ 384/477 |
| 6,732,600 B2 * | 5/2004 | Greubel .................... 74/89.44 |
| 7,036,989 B2 * | 5/2006 | Taki et al. ................. 384/475 |
| 7,044,643 B2 * | 5/2006 | Greubel .................... 384/475 |

FOREIGN PATENT DOCUMENTS

DE    101 07 706 A1    10/2002

\* cited by examiner

*Primary Examiner*—Marcus Charles
(74) *Attorney, Agent, or Firm*—Michael J. Striker

(57) ABSTRACT

A pivot bearing has a radially inner bearing part; a radially outer bearing part, each of the parts defining a conduit for permitting a lubricant to pass through, the radially inner bearing part being supported in a rotary fashion on the radially outer bearing part, a transmission element that communicates the conduits of the parts to permit a lubricant to pass through; and a check valve dividing the conduits into a radially inner conduit system and a radially outer conduit system.

6 Claims, 2 Drawing Sheets

PIVOT BEARING WITH LUBRICANT TRANSMISSION

BACKGROUND OF THE INVENTION

The present invention relates to a pivot bearing having a radially inner bearing part and a radially outer bearing part, each of which defines a conduit for permitting a lubricant to pass through, the radially inner bearing part being supported in rotary fashion on the radially outer bearing part, and having a transmission element that communicates with the conduits to permit the lubricant to pass through.

A pivot bearing of this kind is known, for example, from DE 101 07 706 A1. The radially outer bearing part of this pivot bearing is usually attached to a larger subassembly such as a machine table. The rotatable radially inner bearing part includes the nut of a roller-type linear drive, which nut is to traverse along a stationary spindle. This arrangement permits the machine table to traverse very rapidly, even on long threaded spindles, because the speed of the radially inner bearing part is limited only by the performance data of the threaded nut and not by the critical whirling speed of the long threaded spindle.

Between the radially inner bearing part and the radially outer bearing part, a transmission element is provided, which serves to transmit lubricant from a conduit in the radially outer bearing part to a conduit in the radially inner bearing part. The latter conduit communicates with a lubrication point of the roller-type linear drive so that it can be supplied with lubricating oil via a lubricant connection on the radially outer bearing part. However, problems can arise in this connection as soon as the radially inner bearing part begins to turn very rapidly. The lubricant conduits are usually not completely filled with lubricating oil, as a result of which the centrifugal force conveys the oil into the radially outer bearing part. In particular, even lubricating oil already contained in the roller-type linear drive is conveyed back out of it, which can lead to destruction of the drive due to lack of lubrication. This problem becomes more pronounced with the embodiment according to DE 101 07 706 A1 in that the centrifugal force also conveys the lubricating oil to the lubricating point of the pivot bearing, which has a very large volume.

SUMMARY OF THE INVENTION

Accordingly, it is an object of the present invention is to create a pivot bearing of the type mentioned at the beginning in which the supply of lubricant to the radially inner bearing part is assured even when it is traveling at a high speed.

According to present invention, this object is attained by means of a pivot bearing, in which a check valve divides the above-mentioned conduits into a radially inner conduit system and a radially outer conduit system.

The check valve prevents the lubricant of the radially inner conduit system from traveling into the radially outer conduit system, even when centrifugal forces are acting on the lubricant. The check valve must therefore be installed so that it permits the lubricant to travel only from the radially outer conduit system to the radially inner conduit system, and not vice versa.

The check valve can be situated in the conduit of the radially inner bearing part. This gives the radially inner conduit system a particularly low volume, which means that particularly little lubricant is able to flow back to the check valve, even if the radially inner conduit system is not completely filled with lubricant.

The transmission element is preferably situated between the radially inner and radially outer bearing part because this placement is particularly space-saving. In addition, this placement allows the transmission element to be used to connect the radially outer conduit system to a lubrication point of the pivot bearing. To this end, according to DE 101 07 706 A1, the transmission element can contain a first conduit that connects the conduit in the radially outer bearing part to the conduit in the radially inner bearing part; another conduit is provided on or in the transmission element and connects the latter conduit to the lubrication point of the pivot bearing.

The radially inner bearing part can be supported on the radially outer bearing part by means of a multitude of rolling bodies. This allows the radially inner bearing part to rotate with particularly rapidity in relation to the radially outer bearing part. In this case, the lubrication point in the pivot bearing can be constituted, for example, by the raceways for the rolling bodies on the radially inner and radially outer bearing parts.

The check valve can, for example, be embodied as having a through opening, which is surrounded by elastic material and is normally closed, but opens when a particular pressure difference is exceeded. Preferable elastic materials can include rubber or a rubber-like material. The through opening, preferably embodied in the form of a slot, can be provided, for example, at a closed end of an essentially tubular section of the check valve. In order to be able to embody the valve as a check valve in a structurally simple manner, the essentially tubular section can taper, at least in a direction extending essentially orthogonal to the axis of the tube. Low costs can be assured, for example, by having the valve essentially be entirely comprised of elastic material. It is also advantageous for the checking function if the check valve is situated in the conduit in such a way that the through opening is oriented toward the radially inner conduit system.

The radially inner bearing part can include the nut of a roller-type linear drive; the radially inner conduit system communicates with a lubrication point of the roller-type linear drive. The lubrication point can, for example, be constituted by the raceways on the spindle and the nut. The design according to present invention assures that the roller-type linear drive is reliably supplied with lubricant, even at high nut speeds.

The radially inner bearing part can also include an inner ring of a radial roller bearing that is comprised of at least two parts; the radially inner conduit system extends in only one of the at least two inner ring parts. As a result, during assembly of the pivot bearing, the at least two inner ring parts no longer have to be aligned with each other in the circumference direction in order to prevent a narrowing or blockage of the radially inner conduit system.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
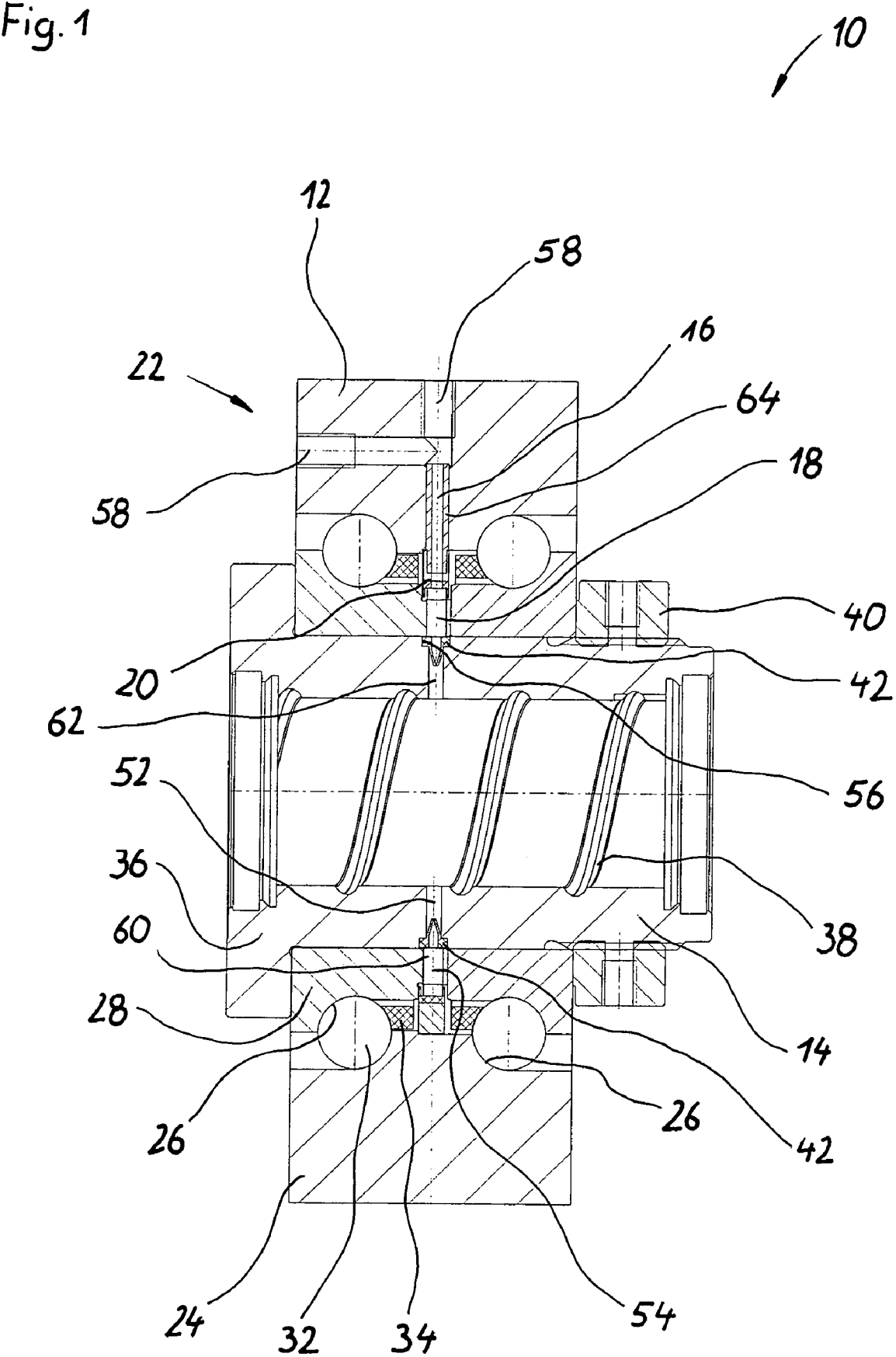
FIG. 1 is a sectional view of a pivot bearing according to the present invention.
Figure 2:
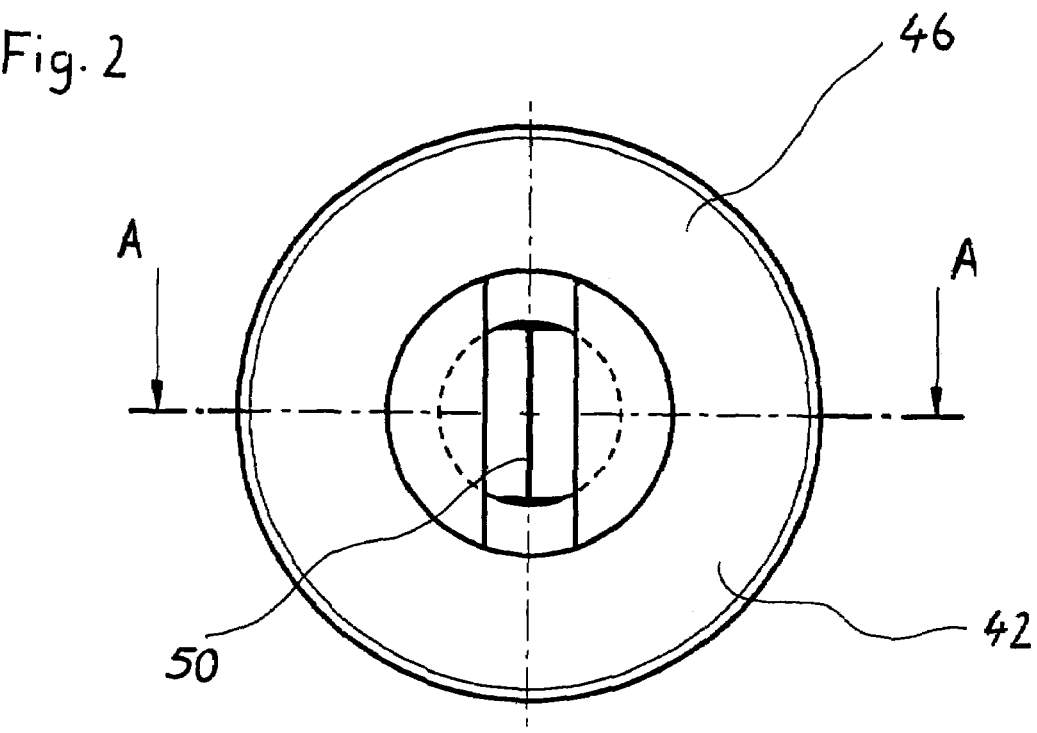
FIG. 2 is a front view of a check valve of the pivot bearing in FIG. 1.
Figure 3:
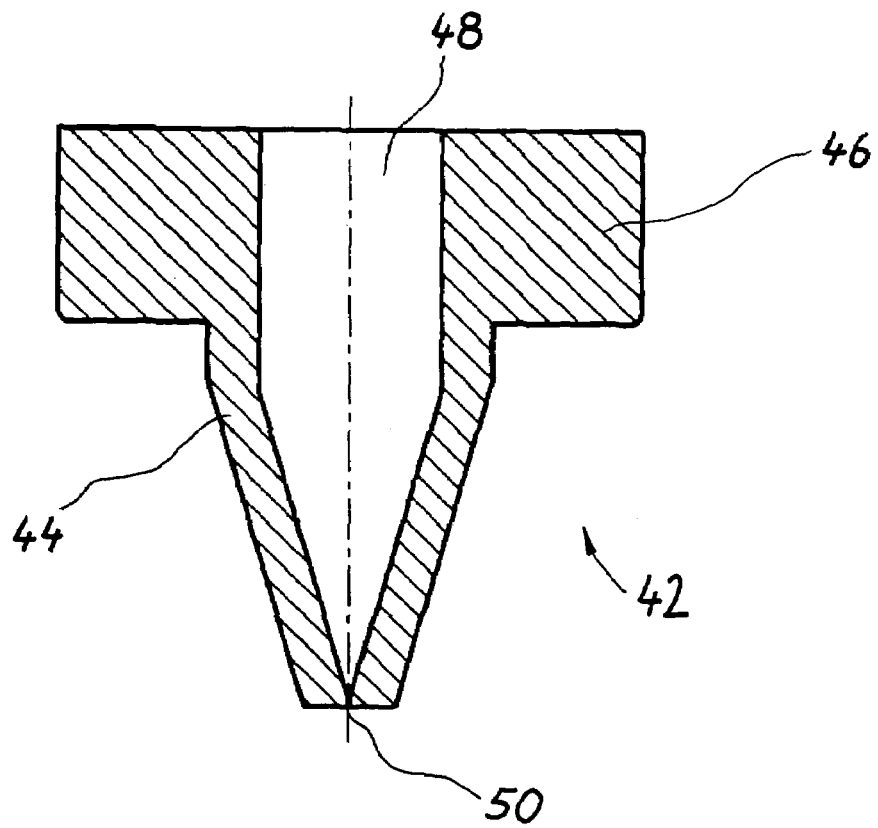
FIG. 3 is a sectional view of the check valve along the line A-A in FIG. 2.

In FIG. 1, a pivot bearing according to the present invention is labeled as a whole with the reference numeral 10. The pivot bearing 10 has a radially outer bearing part 12 and a radially inner bearing part 14. The radially outer bearing 12 is constituted by the outer ring 24 of an angular contact ball bearing 22; the radially inner bearing part 14 is constituted by its inner ring 28 and the nut 36 of a ball-type linear drive (BLD). The spindle and the balls of the ball-type linear drive are not depicted. The inner ring 28 and outer ring 24 of the angular contact ball bearing 22 have raceways 26 on which rolling bodies 32 in the form of balls role in such a way that the radially inner bearing part 14 is supported in rotary fashion on the radially outer bearing part 12. A cage 34 holds the rolling bodies 32 spaced apart from one another.

The outer ring 24 contains conduits 16 to permit lubricant to pass through. The lubricant can be supplied through one of the two lubricant connections 58; the other is sealed by a screw plug that is not shown. The conduit 16 accommodates a tube 64 to which a transmission element 20 is secured. The transmission element is embodied according to DE 101 07 706 A1, the full content of which is included herein by reference. It allows lubricant to pass from the radially outer bearing part 12 to the radially inner bearing part 14 and to the raceways 26 of the angular contact ball bearing 22.

The inner ring 28 is mounted onto the BLD nut 36 in such a way that the two conduits 60 in the inner ring and the two conduits 62 in the BLD nut 36 are situated precisely opposite from one another. A fastening nut 40 secures the two parts in this position. At the joining point between the inner ring 28 and the BLD nut 36, the two conduits 62 of the BLD nut each have a countersunk bore 56 let into them, which accommodates a respective check valve 42. The radially outer conduit system 54 is thus comprised of the conduits in the inner ring 60, the conduits in and on the transmission element 20, and the conduits 16 in the outer ring. The radially inner system 52 is comprised of the two conduits 62 in the BLD nut; the radially inner conduit system communicates with the raceway 38 of the BLD nut 36 so that the lubricant can travel to the raceway 38.

The check valve 42 includes a shaft 44, a flared head 46, and an axial passage 48, which tapers to a slot 50 at the free end of the shaft 44. The check valve 42 is comprised of rubber or a rubber-like material. The end of the shaft 44 with the slot is also designed so that normally, the slot is closed by the inherent elasticity of the check valve material, but it opens when a predetermined pressure difference is exceeded between the pressure in the radially inner conduit system 52 and the pressure in the radially outer conduit system 54. The pressure in the radially outer conduit system can, for example, be generated by a lubricating oil pump. Usually, atmospheric pressure prevails in the radially inner conduit system 52.

The flared head 46 of the check valve rests in the countersunk bore 56 on the outer circumference surface of the BLD nut 36, with its shaft oriented toward the radially inner conduit system. It is held in position here by the inner ring 28. In response to centrifugal forces, the lubricant can only flow back until the two conduits 60 in the BLD nut, which constitute the radially inner conduit system 52, are completely full.

It will be understood that each of the elements described above, or two or more together, may also find a useful application in other types of constructions differing from the types described above.

While the invention has been illustrated and described as embodied in a pivot bearing with lubricant transmission, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A pivot bearing, comprising a radially inner bearing part; a radially outer bearing part, each of said parts defining a conduit for permitting a lubricant to pass through, said radially inner bearing part being supported in a rotary fashion on said radially outer bearing part; a transmission element that communicates said conduits of said parts to permit a lubricant to pass through; and a check valve dividing said conduits into a radially inner conduit system and a radially outer conduit system, wherein said check valve has a through opening that is surrounded by elastic material and is normally closed due to an inherent elasticity of the material, but opens when a predetermined pressure difference is exceeded.

2. A pivot bearing as defined in claim 1, wherein said through opening is provided at a closed end of a substantially tubular section of said check valve.

3. A pivot bearing as defined in claim 2, wherein said through opening is configured as a slot.

4. A pivot bearing as defined in claim 2, wherein said substantially tubular section tapers in a direction extending substantially orthogonal to an axis of a tube.

5. A pivot bearing as defined in claim 1, wherein said check valve is substantially composed entirely of the elastic material.

6. A pivot bearing as defined in claim 1, wherein said check valve is situated so that said through opening is oriented towards said radially inner conduit system.

* * * * *